United States Patent
Linares

(10) Patent No.: US 9,414,072 B1
(45) Date of Patent: Aug. 9, 2016

(54) PERFORMANCE OF THE JPEG ESTIMATED SPECTRUM ADAPTIVE POSTFILTER (JPEG-ESAP) FOR LOW BIT RATES

(71) Applicant: The United States of America as represented by the Administrator of the National Aeronautics and Space Administration, Washington, DC (US)

(72) Inventor: Irving Linares, Columbia, MD (US)

(73) Assignee: The United States of America as represented by the Administrator of the National Aeronautics and Space Administration, Washington, DC (US)

(*) Notice: Subject to any disclaimer, the term of this patent is extended or adjusted under 35 U.S.C. 154(b) by 0 days.

(21) Appl. No.: 14/810,959

(22) Filed: Jul. 28, 2015

Related U.S. Application Data

(60) Provisional application No. 62/118,770, filed on Feb. 20, 2015.

(51) Int. Cl.

| | |
|---|---|
| *G06K 9/36* | (2006.01) |
| *H04N 19/117* | (2014.01) |
| *H04N 19/177* | (2014.01) |
| *H04N 19/124* | (2014.01) |
| *H04N 19/172* | (2014.01) |
| *H04N 19/44* | (2014.01) |
| *H04N 19/625* | (2014.01) |
| *H04N 19/86* | (2014.01) |
| *H04N 19/91* | (2014.01) |

(52) U.S. Cl.
CPC .......... *H04N 19/117* (2014.11); *H04N 19/124* (2014.11); *H04N 19/172* (2014.11); *H04N 19/177* (2014.11); *H04N 19/44* (2014.11); *H04N 19/625* (2014.11); *H04N 19/86* (2014.11); *H04N 19/91* (2014.11)

(58) Field of Classification Search
CPC ....... H04N 7/26244; H04N 7/30; H04N 7/50; H04N 7/26127; H04N 7/26271
See application file for complete search history.

(56) References Cited

U.S. PATENT DOCUMENTS 6,760,487 B1 * 7/2004 Linares ................ H04N 19/117
375/240.02

* cited by examiner

*Primary Examiner* — Duy M Dang

(57) ABSTRACT

Frequency-based, pixel-adaptive filtering using the JPEG-ESAP algorithm for low bit rate JPEG formatted color images may allow for more compressed images while maintaining equivalent quality at a smaller file size or bitrate. For RGB, an image is decomposed into three color bands—red, green, and blue. The JPEG-ESAP algorithm is then applied to each band (e.g., once for red, once for green, and once for blue) and the output of each application of the algorithm is rebuilt as a single color image. The ESAP algorithm may be repeatedly applied to MPEG-2 video frames to reduce their bit rate by a factor of 2 or 3, while maintaining equivalent video quality, both perceptually, and objectively, as recorded in the computed PSNR values.

20 Claims, 5 Drawing Sheets

RELATED ART

PERFORMANCE OF THE JPEG ESTIMATED SPECTRUM ADAPTIVE POSTFILTER (JPEG-ESAP) FOR LOW BIT RATES

STATEMENT OF FEDERAL RIGHTS

The invention described herein was made by employees of the United States Government and may be manufactured and used by or for the Government for Government purposes without the payment of any royalties thereon or therefore.

FIELD

The present invention generally relates to image enhancement, and more particularly, to frequency-based, pixel-adaptive filtering for low bit rates for JPEG format color images.

BACKGROUND

JPEG, a lossy image compression standard based on the discrete cosine transform (DCT), was introduced in 1992. JPEG is firmly entrenched in digital cameras (e.g., Nikon™), smart phones (e.g., Android RAZR™), and web browsers (e.g., Internet Explorer™, Firefox™, etc.). Additionally, JPEG is the basis of today's MPEG-2 high definition television (HDTV) digital satellite news gathering (DSNG) broadcast industry and H.262 video compression.

JPEG-2000 (i.e., JP2), also a lossy image compression standard, but based on the discrete wavelet transform (DWT), was published in 1999. JPEG-2000 has been a JPEG-competing standard since its inception. In 2005, the U.S. Library of Congress embraced JPEG-2000 for permanent electronic storage of digitized images. JPEG-2000 is also supported by other smart phone brands (e.g., Apple iPhone™).

The estimated spectrum adaptive postfilter (ESAP) reuses the DCT coefficients of a decoded grayscale JPEG image to postfilter and enhance the image. ESAP pixel-adaptive filters minimize the JPEG 8×8 blocking distortion without requiring any additional bit stream overhead. A key improvement is that ESAP not only adaptively filters out the JPEG blocking distortion, but also does not introduce the ringing artifacts inherent to JPEG-2000. ESAP complies with the Independent JPEG Group (IJG) Software™, Release 8c, found at http://www.iig.org. Baseline JPEG uses Huffman entropy coding, whereas JPEG-2000 and ESAP-AC both use arithmetic entropy coding (AC).

Most of the quality improvement of JPEG-2000 over baseline JPEG images is likely due to the arithmetic entropy coding utilized by JPEG-2000 versus the Huffman coding initially used by JPEG. Similarly, when JPEG uses AC instead of Hoffman coding, as in the IJG Software™ command example:

cjpeg -quality 5 -arithmetic img.ppm img.jpg, a remarkable visual improvement of the JPEG image is observed. When the image is further filtered by the pixel-adaptive ESAP process, the ESAP-AC image visual and peak signal-to-noise ratio (PSNR) quality either matches or surpasses the quality of JPEG-2000. The excellent DCT energy compaction properties are thus exulted with usage of AC.

A previous version of the ESAP algorithm was applied to grayscale images only. ESAP, in its most recent version, operates in the RGB color image space.

SUMMARY

Certain embodiments of the present invention may provide solutions to the problems and needs in the art that have not yet been fully identified, appreciated, or solved by conventional image processing algorithms. For example, some embodiments of the present invention pertain to using JPEG-ESAP for frequency-based, pixel-adaptive filtering for low bit rates (i.e., less than 0.25 bits/pixel) for JPEG format color images.

In an embodiment, a computer-implemented method includes creating JPEG quantization coefficients, by a computing system, for each respective color plane of a plurality of color planes. The computer-implemented method also includes JPEG decoding each color plane, by the computing system, to generate YCbCr DCT coefficients for ESAP postfiltering. The computer-implemented method further includes ESAP postfiltering each of the color planes, by the computing system, and outputting a JPEG image file and an ESAP postfiltered image file, by the computing system.

In another embodiment, a computer program is embodied on a non-transitory computer-readable medium. The program configured to cause at least one processor to convert an input image to a portable pix map (PPM) format and decompose the PPM image into color planes in portable graymap (PGM) format. The computer program is also configured to cause the at least one processor to create JPEG quantization coefficients for each respective color plane, JPEG decode each color plane to generate YCbCr DCT for ESAP postfiltering and ESAP postfilter each color plane. The computer program is further configured to cause the at least one processor to combine PGM JPEG planes for each color, combine PGM ESAP planes for each color into PPM, and output a JPEG image file and an ESAP postfiltered image file.

In yet another embodiment, an apparatus includes memory storing computer program instructions and at least one processor configured to execute the computer program instructions stored in the memory. The at least one processor is configured to receive a video comprising a series of images. For each of the received images, the at least one processor is also configured to create JPEG quantization coefficients for each respective color plane of a plurality of color planes, JPEG decode each color plane to generate YCbCr DCT coefficients for ESAP postfiltering, ESAP postfilter each of the color planes, and output a JPEG image file and an ESAP postfiltered image file. The at least one processor is further configured to output a sequence of PPM images and re-code the sequence of PPM images into an enhanced blocking distortion-minimized MPEG-2 or MPEG-4 video sequence.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments of the present invention pertain to using JPEG-ESAP for frequency-based, pixel-adaptive filtering for low bit rates (i.e., less than 0.25 bits/pixel) for JPEG format color images. For RGB, for example, an image is decomposed into three color bands—red, green, and blue. However, other bands may be used in certain embodiments, for instance, RGBY. The JPEG-ESAP algorithm is then applied for each band (e.g., once for red, once for green, and once for blue in RGB) and the output of each application of the algorithm is rebuilt as a color image by combining the ESAP filtered RGB planes (for RGB schemes) in grayscale portable graymap (PGM) format into color portable pix map (PPM) format.

Figure 1:
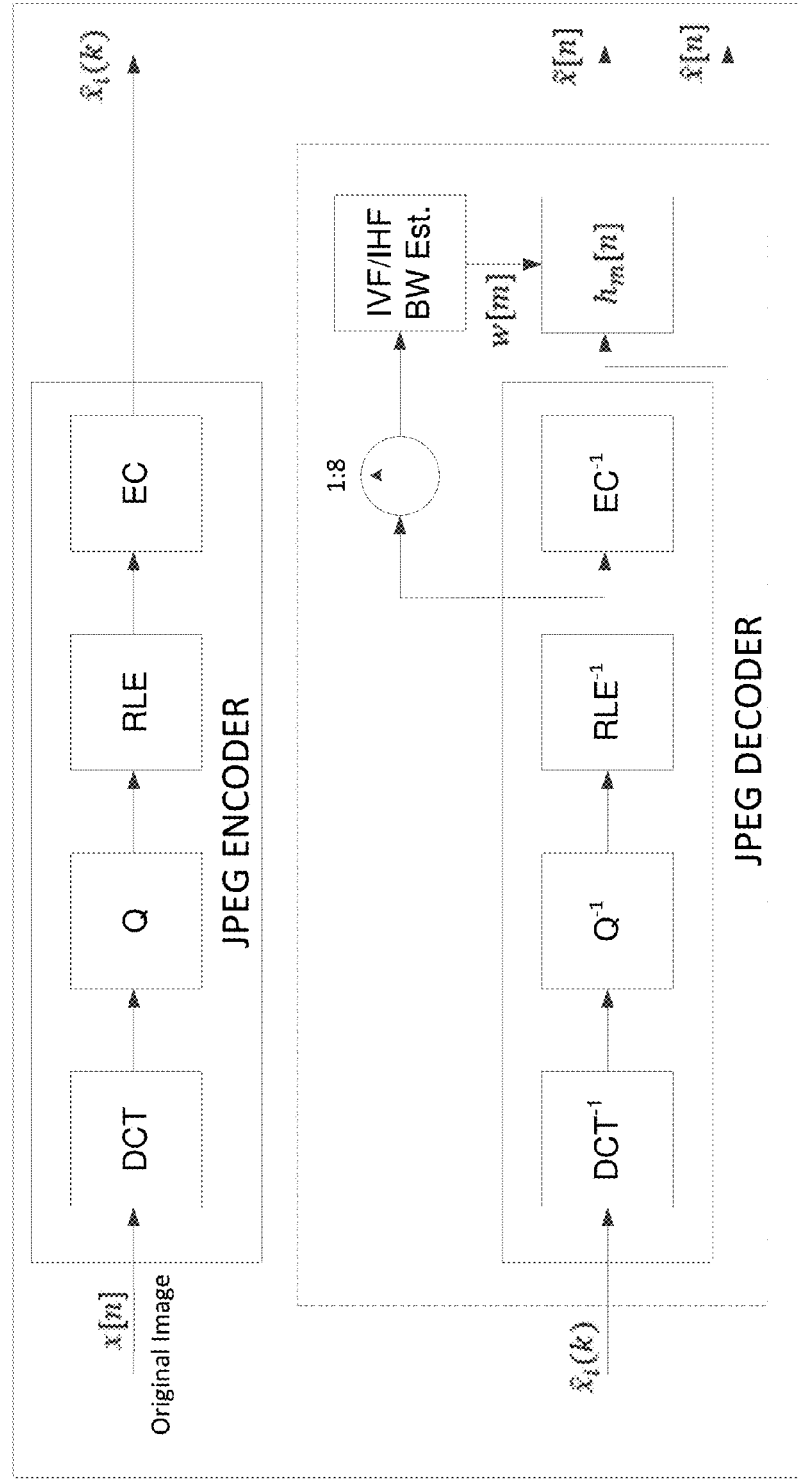
FIG. 1 is a block diagram illustrating the grayscale ESAP decoder algorithm.

ESAP estimates two-dimensional (2-D) pixel-adaptive bandwidths directly from the dequantized DCT coefficients without requiring any additional overhead. The ESAP decoder algorithm 100 that is applied to each color plane is shown in FIG. 1. For more detail on a grayscale implementation, see Linares I., Mersereau R. M., and Smith M. J. T., "*JPEG Estimated Spectrum Adaptive Postfilter Using Image-Adaptive Q-Tables and Canny Edge Detectors*," ISCAS '96 International Symposium on Circuits and Systems, IEEE, Atlanta, Ga., pp. 722-725, Vol. 2, May 12, 1996, as well as U.S. Pat. No. 6,760,487.

A simple, one-pass, non-iterative process is used for w[m] bandwidth estimation and for ESAP $h_m[n]$ filtering. Each DCT block 2-D bandwidth is vertically and horizontally separable and determined from Table 1 below.

| Highest DCT Coefficient | Normalized 1-D Bandwidth |
|---|---|
| $c_0$ | $0.125\pi$ |
| $c_1$ | $0.250\pi$ |
| $c_2$ | $0.375\pi$ |
| $c_3$ | $0.500\pi$ |
| $c_4$ | $0.625\pi$ |
| $c_5$ | $0.750\pi$ |
| $c_6$ | $0.875\pi$ |
| $c_7$ | $1.000\pi$ |

Figure 2:
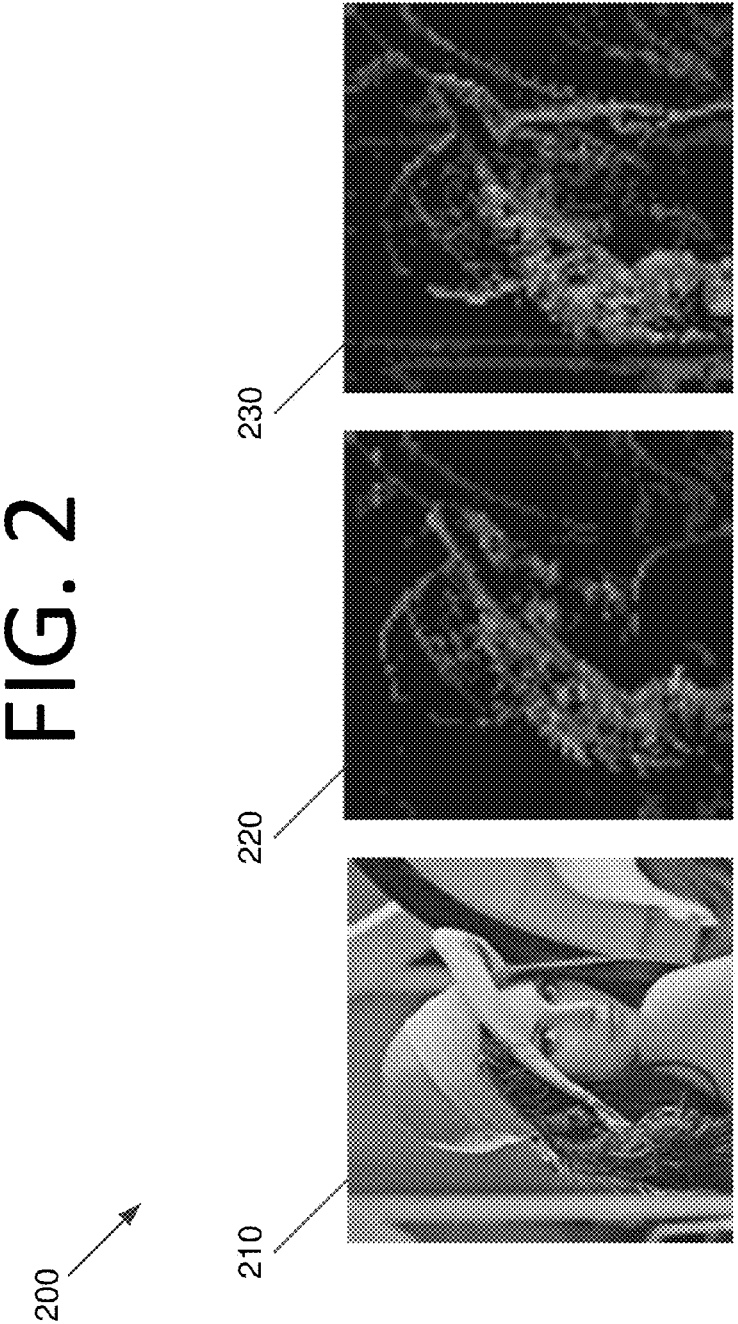
FIG. 2 illustrates a series of Lena images showing output of the 2-D, 1:8 ESAP frequency up sampler for the blue plane, according to an embodiment of the present invention.
Figure 3:
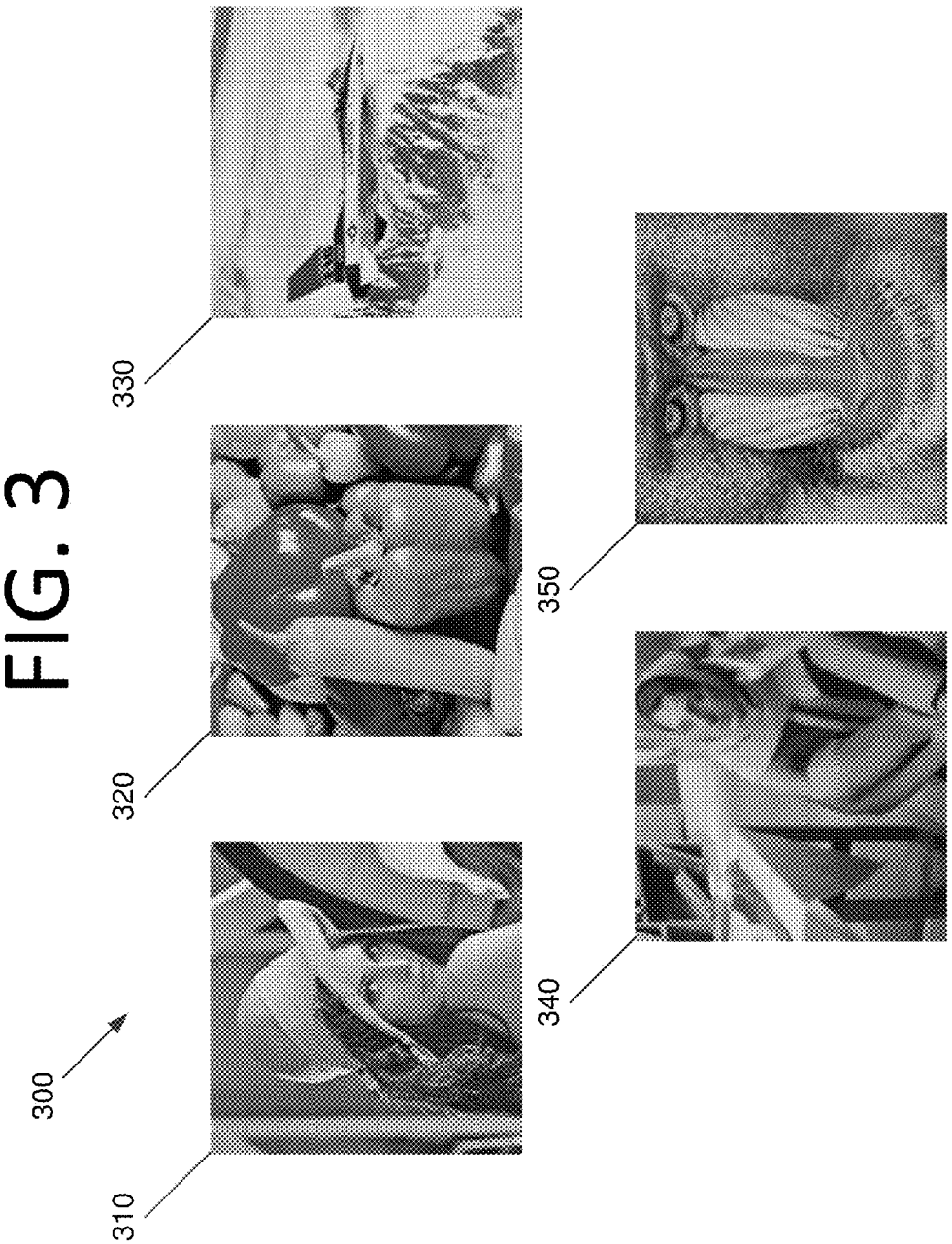
FIG. 3 illustrates the Lena, peppers, airplane, Barbara, and mandrill images referred to in Table 2 that were processed according to an embodiment of the present invention.

FIG. 2 illustrates a series of images 200 showing output of the 2-D, 1:8 ESAP frequency up sampler for the blue plane, according to an embodiment of the present invention. Original image 210 is in color, but is shown in grayscale here. The 2-D interpolated vertical frequency (IVF) image 220 and the interpolated horizontal frequency (IHF) image 230, which are grayscale, show the interpolated DCT bandwidths w[m] scaled for 8-BPP display.

The IVF and IHF then drive a separable, pixel-adaptive, non-causal 2-D $h_m[n]$ Hamming window low pass filter that is applied in a raster manner to each pixel and its surrounding 17×17 area of support. This filtering minimizes the DCT blocking while performing negligible filtering in the high frequency areas of the image consisting of edges or highly textured areas. This process takes advantage of the ability of the human visual system to mask the JPEG quantization noise present in the high frequency areas.

Some experimental observations regarding JPEG, ESAP-AC, and JPEG-2000 based on the processed color test images include, but are not limited to, the following: (1) the ESAP-AC PSNR is always higher than the DWT-based JPEG-2000 images compressed at similar bit rates, for typical test images; (2) ESAP-AC performs equally to or better than JPEG-2000 images; (3) ESAP visual quality is better than JPEG-2000 for high frequency content images; (4) ESAP visual quality is comparable to JPEG-2000 for low frequency content images, and the arithmetic coding entropy option for JPEG should be used rather than the baseline Huffman coding option; (5) JPEG AC provides a better quality image than JPEG Huffman coding at comparable bit rates; (6) ESAP-AC should be turned on for bit rates below 0.5 BPP; (7) for bit rates higher than 0.5 BPP, JPEG images should only choose to use JPEG-AC without ESAP post-processing; (8) ESAP may be implemented in fast electronics, such as FPGAs, ASICs, or DSPs, which could reduce the processing time by several orders of magnitude; (9) ESAP is an optional post-processing step at the receiver or decoder fully capable of removing the JPEG/MPEG-2 blocking distortion; and (10) ESAP does not increase the coded stream bit rate.

Some embodiments are also potentially applicable to MPEG-2 video. An MPEG-2 Group of Pictures (GOP) is a sequence of JPEG-like, DCT coded intraframes (I), bidirectional (B) frames, and forward predicted (P) frames. All types of frames may be coded with JPEG-AC, and then ESAP may be applied to filter the decoded frames. A typical MPEG-2 CCIR-601 GOP sequence with an I-frame distance of 15 and a P-frame distance of 3, such as IBBPBBPBBPBBPBB, has an I-frame bit rate of about 1.2 BPP, a P-frame bit rate of 0.6 BPP, and a B-frame bit rate of 0.23 BPP. The equivalent average bit rate for this GOP sequence is 0.38 BPP.

By extension to each frame, applying JPEG-AC and ESAP to MPEG-2 frames in a GOP sequence could reduce the MPEG-2 bit rate by a factor of two without detrimentally affecting the video quality, and while retaining an equivalent video quality at an approximate average bit rate of 0.19 BPP. Comparative objective PSNR among JPEG, ESAP, and JPEG-2000 versions of a series of images 300 at 0.20, 0.25, 0.50, and 1.00 BPP is shown in Table 2 below with respect to the Lena 310, peppers 320, airplane 330, Barbara 340, and mandrill 350 images.

Comparative Objective PSNR Among JPEG, ESAP, and JPEG-2000 Images

| Image @ 0.20 BPP | Baseline JPEG PSNR | ESAP-AC PSNR | Δ PSNR ESAP-AC over JPEG | JP2 PSNR | Δ PSNR JP2 over JPEG | Δ PSNR ESAP over JP2 |
|---|---|---|---|---|---|---|
| Lena | 26.15 | 30.88 | 4.72 | 29.41 | 3.26 | 1.47 |
| Peppers | 24.34 | 29.62 | 5.28 | 27.74 | 3.41 | 1.88 |
| Airplane | 24.08 | 30.45 | 6.38 | 28.70 | 4.63 | 1.75 |
| Barbara | 22.19 | 25.59 | 3.40 | 25.41 | 3.22 | 0.18 |
| Mandrill | 19.76 | 21.55 | 1.79 | 20.88 | 1.13 | 0.66 |

| Image @ 0.25 BPP | Baseline JPEG PSNR | ESAP-AC PSNR | Δ PSNR ESAP-AC over JPEG | JP2 PSNR | Δ PSNR JP2 over JPEG | Δ PSNR ESAP over JP2 |
|---|---|---|---|---|---|---|
| Lena | 28.55 | 31.65 | 3.10 | 30.11 | 1.56 | 1.54 |
| Peppers | 27.59 | 30.48 | 2.89 | 28.44 | 0.85 | 2.04 |

-continued

| Image @ 0.25 BPP | Baseline JPEG PSNR | ESAP-AC PSNR | Δ PSNR ESAP-AC over JPEG | JP2 PSNR | Δ PSNR JP2 over JPEG | Δ PSNR ESAP over JP2 |
|---|---|---|---|---|---|---|
| Airplane | 27.69 | 31.55 | 3.87 | 29.55 | 1.86 | 2.01 |
| Barbara | 23.91 | 26.47 | 2.56 | 26.36 | 2.46 | 0.10 |
| Mandrill | 20.52 | 22.00 | 1.48 | 21.33 | 0.81 | 0.67 |

| Image @ 0.50 BPP | Baseline JPEG PSNR | ESAP-AC PSNR | Δ PSNR ESAP-AC over JPEG | JP2 PSNR | Δ PSNR JP2 over JPEG | Δ PSNR ESAP over JP2 |
|---|---|---|---|---|---|---|
| Lena | 32.84 | 33.87 | 1.03 | 32.39 | −0.55 | 1.58 |
| Peppers | 31.76 | 32.43 | 0.67 | 30.70 | −1.06 | 1.74 |
| Airplane | 33.05 | 34.77 | 1.72 | 32.69 | −0.36 | 2.08 |
| Barbara | 27.94 | 30.04 | 2.10 | 29.46 | 1.53 | 0.57 |
| Mandrill | 22.96 | 23.90 | 0.94 | 22.90 | −0.06 | 1.00 |

| Image @ 1.00 BPP | Baseline JPEG PSNR | ESAP-AC PSNR | Δ PSNR ESAP-AC over JPEG | JP2 PSNR | Δ PSNR JP2 over JPEG | Δ PSNR ESAP over JP2 |
|---|---|---|---|---|---|---|
| Lena | 35.68 | 36.29 | 0.61 | 34.40 | −1.28 | 1.89 |
| Peppers | 33.93 | 34.23 | 0.30 | 32.56 | −1.37 | 1.67 |
| Airplane | 37.18 | 38.14 | 0.96 | 36.00 | −1.18 | 2.14 |
| Barbara | 32.86 | 34.36 | 1.50 | 32.94 | 0.08 | 1.42 |
| Mandrill | 25.44 | 26.33 | 0.89 | 24.92 | −0.52 | 1.41 |

A visual and PSNR comparison of baseline JPEG images coded at 1.0 BPP (Table 2, fourth table) versus the quality of the same images coded at half the bit rate (0.5 BPP in the third table) using ESAP-AC (column 3), demonstrates the two times compression potential of ESAP-AC versus baseline JPEG at one times compression. Similarly, comparing column 3 (ESAP-AC) versus column 5 (JPEG-2000 or JP2) images compressed at the same bit rate shows the improved visual quality of ESAP-AC over baseline coded JP2 images. The same comparisons can be made for the 0.5 versus 0.25 BPP rates as well. All of the images listed in Table 2 can also be viewed in full detail at the NASA ITPO website http://techtransfer.gsfc.nasa.gov/ft_tech_esap.shtm. The website details the PSNR, BPP, and CR statistics for each image as well.

ESAP can also remove blocking artifacts in MPEG-2 GOP frames. As a related example of MPEG-2 laboratory video processing, frame sequences extracted from MPEG-2 video using ffmpeg software, then compressed at half or a third of their original bit rate using ffmpeg, and in parallel, also post-processed with ESAP-AC before reassembling into an ESAP-AC ffmpeg video sequence, show significant video improvement, with imperceptible or minimized DCT blocking over their respective 2X and 3X compressed MPEG-2 sequences. In these ffmpeg video experiments, it was verified that the ESAP-AC MPEG-2 video sequences compare very well in visual quality against their respective MPEG-4 sequences coded at the same 2X and 3X video compression ratios.

This breakthrough bit rate reduction creates exciting new opportunities for digital video content service providers, webcasting, and satellite video. Some such opportunities include, but are not limited to, the following: (1) ESAP-AC could make 50% of the digital bandwidth reduction available to approximately double the number of digital MPEG-2 HDTV terrestrial channels over the same bandwidth without changing the broadcasting infrastructure; (2) ESAP-AC could also allow the extra 50% bandwidth to seamlessly integrate, multiplex, and provide UHDTV MPEG-4 content alongside HDTV MPEG-2 over the same digital pipe for dual, HDTV-UHDTV compatible receiver sets; (3) decoupled coexistence of both HDTV standards should provide many more choices for commercial video providers and consumers; and (4) Earth orbiting and planetary spacecraft video would certainly benefit from lower bit rates as well that could improve the SNR of the received signal.

As discussed above, the ESAP algorithm may be applied to RGB color images. The ESAP-AC PSNR is always higher than default settings JPEG-2000 images compressed at similar bit rates. ESAP-AC post-processing yields better PSNRs than default settings compressed JPEG-2000 images due to ESAP's excellent ability to remove DCT blocking artifacts without introducing the DWT ringing inherent to JPEG-2000.

ESAP Algorithm for RGB JPEG Image Processing

An embodiment of the ESAP algorithm may be implemented in the IJG Software™ discussed above using the cjpeg -arithmetic option and the ImageMagick™ convert utility, which can be found at http://www.imagemagick.org. The pseudocode is shown in the esap_script below:

```
esap_script          image.fmt        QF        esap_img.ppm
// The input image format "fmt" is any of:
// PPM, PGM, GIF, JPG, TIFF, BMP, etc. The JPEG quality factor
// "QF" is a [0..100] integer. The output is the filtered esap_img.ppm image.
// 1. Convert input image to a portable pix map (PPM) format, and then
// decompose into RGB planes in portable graymap (PGM) format.
convert          image.fmt        image.ppm
ppm2rgb          image.ppm        image.r.pgm        image.g.pgm        image.b.pgm
// 2. Create JPEG RGB Quantization Coefficients
cjpeg        -quality QF        -arith image.r.pgm        image.r.jpg
cjpeg        -quality QF        -arith image.g.pgm        image.g.jpg
cjpeg        -quality QF        -arith image.b.pgm        image.b.jpg
// 3. JPEG decode each R, G, and B planes. Then ESAP-filter each
// plane. The modified djpeg decoder generates the YCbCr DCT coefficients
// necessary to perform ESAP postfiltering.
djpeg        image.r.jpg           image.r.djpg.pgm
esap         image.r.djpg.pgm           DCTcoeffs.r        esap_image.r.pgm
djpeg        image.g.jpg           image.g.djpg.pgm
esap         image.g.djpg.pgm           DCTcoeffs.g        esap_image.g.pgm
djpeg        image.b.jpg           image.b.djpg.pgm
esap         image.b.djpg.pgm           DCTcoeffs.b        esap_image.b.pgm
// 4. Combine RGB PGM JPEG planes into ppm
rgb2ppm      image.r.djpg.pgm            image.g.djpg.pgm
```

```
            image.b.djpg.pgm\
            image.djpg.ppm
// 5. Combine RGB PGM ESAP planes into ppm
rgb2ppm    esap_image.r.pgm          esap_image.g.pgm
            esap_image.b.pgm\
            esap_image.ppm
// 6. Compute grayscale Mean Square Errors (MSEs) for each color plane and
// output results to file
mse        image.r.pgm          image.r.djpg.pgm     >> file.txt
mse        image.g.pgm          image.g.djpg.pgm     >> file.txt
mse        image.b.pgm          image.b.djpg.pgm     >> file.txt
mse        image.r.pgm          esap_image.r.pgm     >> file.txt
mse        image.g.pgm          esap_image.g.pgm     >> file.txt
mse        image.b.pgm          esap_image.b.pgm     >> file.txt
// 7. Compute the peak signal-to-noise ratios (PSNRs) as a function of the
// above MSEs for the JPEG and ESAP images. Also compute PPM
// compression factor (CF) X:1 ratios and bit rates (BPPs).
compute_psnr_cf >> file.txt
```

The PSNR of an RGB image is defined as:

$$PSNR_{RGB} = 10 * \log_{10}(255^2/(MSE_R + MSE_G + MSE_B)/3) \quad (1)$$

For each color plane $c = \{R, G, \text{or } B\}$, the mean-square-error (MSE) is:

$$MSE_C = \frac{1}{N_1 N_2} \sum_{n_1=0}^{N_1-1} \sum_{n_2=0}^{N_2-1} (x_1[n_1][n_2] - x_2[n_1][n_2])^2 \quad (2)$$

Figure 4:
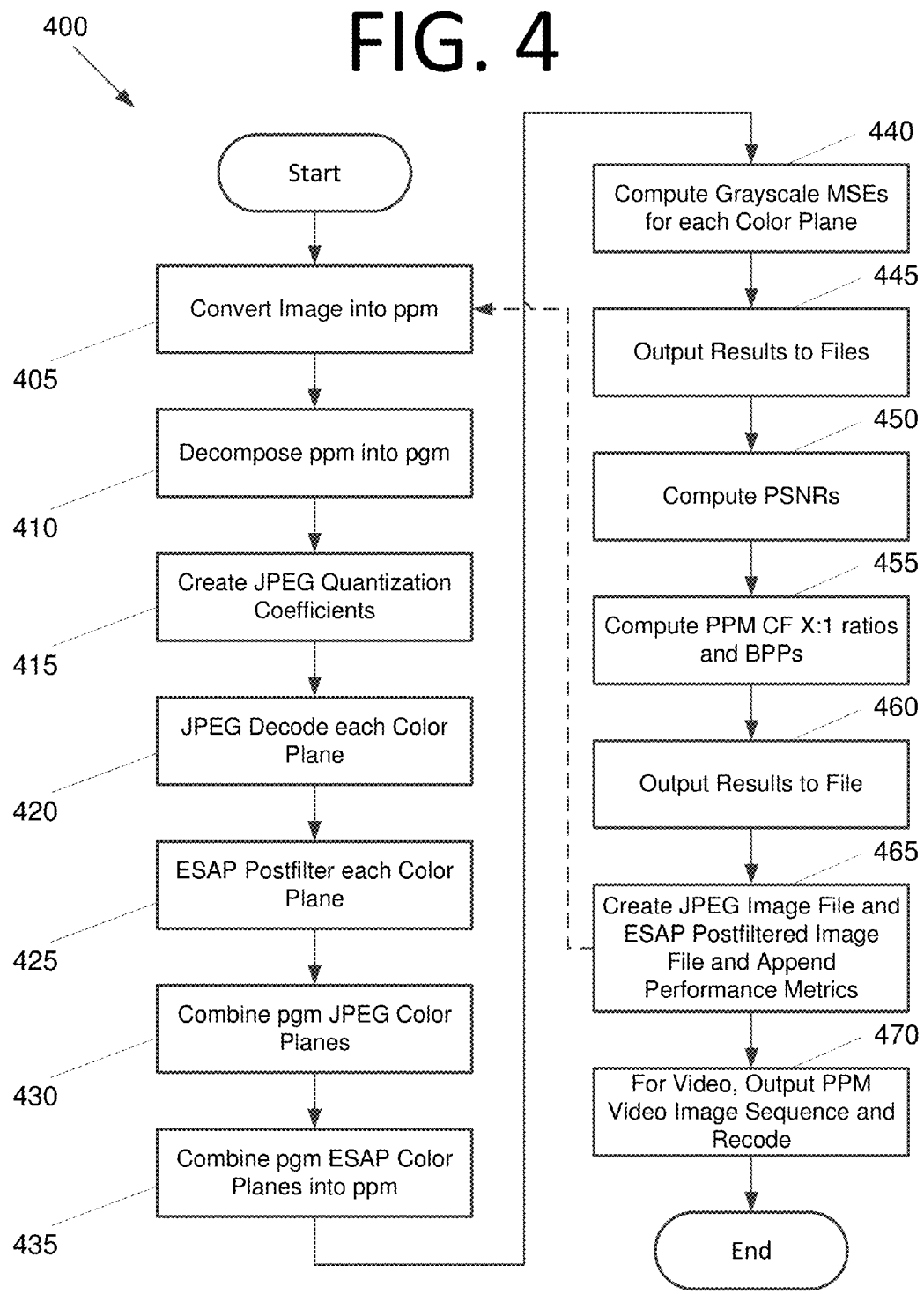
FIG. 4 is a flowchart illustrating a process for improved JPEG-ESAP processing of color images, according to an embodiment of the present invention.

FIG. 4 is a flowchart 400 illustrating a process for improved JPEG-ESAP processing of color images, according to an embodiment of the present invention. The process begins with converting an input image to a PPM format at 405 and then decomposing the ppm image into color planes in PGM format at 410. Next, JPEG quantization coefficients are created for each respective color plane at 415. In some embodiments, the colors of the color planes may be RGB, RGBY, or any other suitable color scheme.

Each color plane is JPEG decoded at 420 and ESAP postfiltered at 425. The decoder generates the YCbCr DCT coefficients necessary to perform ESAP postfiltering. The PGM JPEG planes for each color are combined at 430 and the PGM ESAP planes for each color are combined into PPM at 435.

Grayscale MSEs are computed for each color plane at 440 and the results are output to files at 445. The purpose of this output is to compute a single color PSNR metric for each decoded and each postfiltered color image. The PSNRs are computed for the JPEG and ESAP images at 450 and the PPM CF X:1 ratios and BPPs are computed at 455. The results of the computations are then output to file at 460. The purpose of this output is to gather and record PSNR performance metrics as a function of the compression ratio (or equivalently, as a function of the BPP rate) for each processed image.

The final output of the color JPEG-ESAP processing is a JPEG image file and an ESAP postfiltered image file, which are created at 465. Baseline Huffman entropy coding, or alternatively, arithmetic entropy coding may be used for the creation of both images. Also performance metrics may be computed and appended to a file for each processed image. For video, such as MPEG-2, the process may be repeated for multiple frames of the video or all frames of the video, as shown by the dashed line. The final output of MPEG-2 ESAP video processing is a sequence of PPM images that can be re-coded into an enhanced blocking distortion-minimized MPEG-2 or MPEG-4 video sequence at 470.

Figure 5:
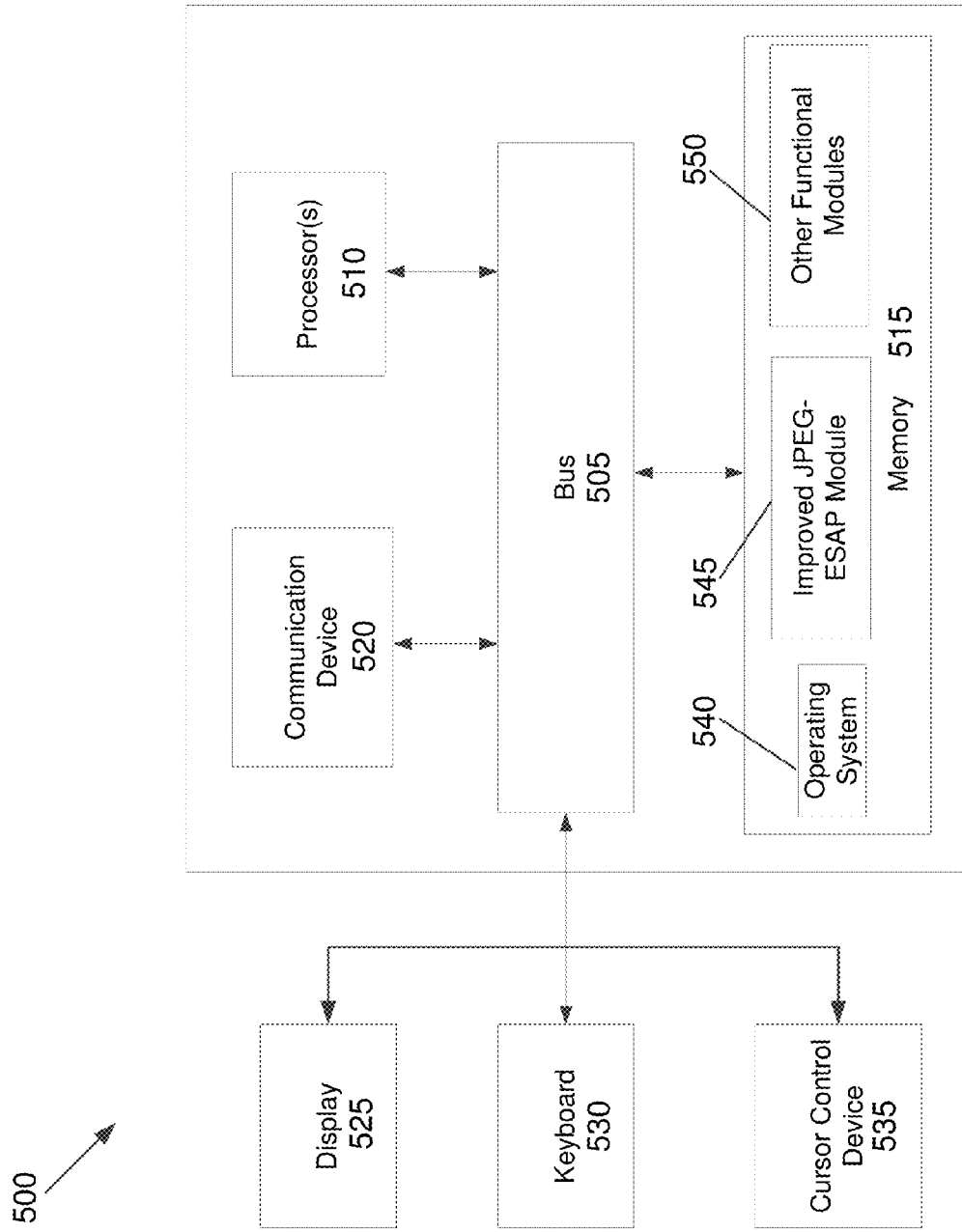
FIG. 5 is a block diagram of a computing system configured to perform improved JPEG-ESAP processing of color images, according to an embodiment of the present invention.

FIG. 5 is a block diagram of a computing system 500 configured to perform improved JPEG-ESAP processing of color images, according to an embodiment of the present invention. Computing system 500 includes a bus 505 or other communication mechanism for communicating information, and processor(s) 510 coupled to bus 505 for processing information. Processor(s) 510 may be any type of general or specific purpose processor, including a central processing unit ("CPU") or application specific integrated circuit ("ASIC"). Processor(s) 510 may also have multiple processing cores, and at least some of the cores may be configured to perform specific functions. Multi-parallel processing may be used in some embodiments. Computing system 500 further includes a memory 515 for storing information and instructions to be executed by processor(s) 510. Memory 515 can be comprised of any combination of random access memory (RAM), read only memory (ROM), flash memory, cache, static storage such as a magnetic or optical disk, or any other types of non-transitory computer-readable media or combinations thereof. Additionally, computing system 500 includes a communication device 520, such as a transceiver and antenna, to wirelessly provide access to a communications network.

Non-transitory computer-readable media may be any available media that can be accessed by processor(s) 510 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 510 are further coupled via bus 505 to a display 525, such as a Liquid Crystal Display (LCD), for displaying information to a user. A keyboard 530 and a cursor control device 535, such as a computer mouse, are further coupled to bus 505 to enable a user to interface with computing system. However, in certain embodiments such as those for mobile computing implementations, a physical keyboard and mouse may not be present, and the user may interact with the device solely through display 525 and/or a touchpad (not shown). Any type and combination of input devices may be used as a matter of design choice.

Memory 515 stores software modules that provide functionality when executed by processor(s) 510. The modules include an operating system 540 for computing system 500. The modules further include an improved JPEG-ESAP module 545 that is configured to perform JPEG-ESAP processing of color images. Computing system 500 may include one or more additional functional modules 550 that include additional functionality.

One skilled in the art will appreciate that a "system" could be embodied as an embedded computing system, a personal computer, a server, a console, a personal digital assistant (PDA), a cell phone, a tablet computing device, a cable TV set top box, an HDTV or UHDTV set, a digital video disk (DVD) player, a Blu-ray player, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIG. 4 may be performed by a computer program, encoding instructions for the nonlinear adaptive processor to perform at least the process described in FIG. 4, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the process described in FIG. 4, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:
1. A computer-implemented method, comprising:
creating JPEG quantization coefficients, by a computing system, for each respective color plane of a plurality of color planes;

JPEG decoding each color plane, by the computing system, to generate YCbCr discrete cosine transform (DCT) coefficients for estimated spectrum adaptive postfilter (ESAP) postfiltering;
ESAP postfiltering each of the color planes, by the computing system; and
outputting a JPEG image file and an ESAP postfiltered image file, by the computing system.

2. The computer-implemented method of claim 1, wherein the input image comprises a frame of an MPEG-2 video and the method of claim 1 is repeated for a plurality of frames of the MPEG-2 video.

3. The computer-implemented method of claim 1, further comprising:
converting an input image, by a computing system, to a portable pix map (PPM) format; and
decomposing the PPM image, by the computing system, into color planes in portable graymap (PGM) format.

4. The computer-implemented method of claim 1, further comprising:
combining portable graymap (PGM) JPEG planes, by the computing system, for each of the colors into portable pix map (PPM) format.

5. The computer-implemented method of claim 1, further comprising:
combining portable graymap (PGM) ESAP planes, by the computing system, for each color into PPM.

6. The computer-implemented method of claim 1, further comprising:
computing, by the computing system, grayscale mean-square-errors (MSEs) for each color plane.

7. The computer-implemented method of claim 6, further comprising:
outputting results of the grayscale MSE computations, by the computing system, to one or more files.

8. The computer-implemented method of claim 1, further comprising:
computing peak signal-to-noise ratios (PSNRs), by the computing system, for ESAP and JPEG images; and
computing, by the computing system, portable pix map (PPM) compression factor (CF) X:1 ratios and bits per pixel (BPPs).

9. The computer-implemented method of claim 8, further comprising:
outputting the results of the computed PPM CF X:1 ratios and BPPs, by the computing system, to a file.

10. The computer-implemented method of claim 1, wherein when the input image is part of an MPEG-2 or MPEG-4 video, the method further comprises:
outputting a sequence of portable pix map (PPM) images; and
re-coding the sequence of PPM images into an enhanced blocking distortion-minimized MPEG-2 or MPEG-4 video sequence.

11. A computer program embodied on a non-transitory computer-readable medium, the program configured to cause at least one processor to:
convert an input image to a portable pix map (PPM) format;
decompose the PPM image into color planes in portable graymap (PGM) format;
create JPEG quantization coefficients for each respective color plane;
JPEG decode each color plane to generate YCbCr discrete cosine transform (DCT) for estimated spectrum adaptive postfilter (ESAP) postfiltering;
ESAP postfilter each color plane;
combine PGM JPEG planes for each color;
combine PGM ESAP planes for each color into PPM; and
output a JPEG image file and an ESAP postfiltered image file.

12. The computer program of claim 11, the program further configured to cause the at least one processor to:
compute grayscale mean-square-errors (MSEs) for each color plane; and
output results of the grayscale MSE computations to one or more files.

13. The computer program of claim 11, wherein the program is further configured to cause the at least one processor to:
compute peak signal-to-noise ratios (PSNRs) for ESAP and JPEG images;
compute PPM compression factor (CF) X:1 ratios and bits per pixel (BPPs); and
output the results of the computed PPM CF X:1 ratios and BPPs to a file.

14. The computer program of claim 11, wherein the input image comprises a frame of an MPEG-2 video and the method of claim 1 is repeated for a plurality of frames of the MPEG-2 video.

15. The computer program of claim 1, wherein when the input image is part of an MPEG-2 video, the program is further configured to cause the at least one processor to:
output a sequence of PPM images; and
re-code the sequence of PPM images into an enhanced blocking distortion-minimized MPEG-2 or MPEG-4 video sequence.

16. An apparatus, comprising:
memory storing computer program instructions; and
at least one processor configured to execute the computer program instructions stored in the memory, wherein the at least one processor is configured to:
receive a video comprising a series of images,
for each of the received images,
create JPEG quantization coefficients for each respective color plane of a plurality of color planes,
JPEG decode each color plane to generate YCbCr discrete cosine transform (DCT) coefficients for estimated spectrum adaptive postfilter (ESAP) postfiltering,
ESAP postfilter each of the color planes, and
output a JPEG image file and an ESAP postfiltered image file,
output a sequence of portable pix map (PPM) images, and
re-code the sequence of PPM images into an enhanced blocking distortion-minimized MPEG-2 or MPEG-4 video sequence.

17. The apparatus of claim 16, wherein, for each of the series of images, the at least one processor is further configured to:
convert the image to a PPM format; and
decompose the PPM image into color planes in portable graymap (PGM) format.

18. The apparatus of claim 16, wherein, for each of the series of images, the at least one processor is further configured to:
combine portable graymap (PGM) JPEG planes for each of the colors; and
combine PGM ESAP planes for each color into PPM.

19. The apparatus of claim 16, wherein, for each of the series of images, the at least one processor is further configured to:
compute grayscale mean-square-errors (MSEs) for each color plane; and output results of the grayscale MSE computations to one or more files.

20. The apparatus of claim 16, wherein, for each of the series of images, the at least one processor is further configured to:
compute peak signal-to-noise ratios (PSNRs) for ESAP and JPEG images;
compute PPM compression factor (CF) X:1 ratios and bits per pixel (BPPs); and
output the results of the computed PPM CF X:1 ratios and BPPs to a file.

\* \* \* \* \*